US012592407B2

(12) United States Patent　　　(10) Patent No.: US 12,592,407 B2
Kim et al.　　　　　　　　　　　　(45) Date of Patent: Mar. 31, 2026

(54) BATTERY CELL TRANSPORT SYSTEM FOR A BATTERY CELL

(71) Applicant: LG Energy Solution, Ltd., Seoul (KR)

(72) Inventors: Eric Kim, Wyoming, MI (US); Hyukjun Jang, Hudsonville, MI (US)

(73) Assignee: LG Energy Solution, Ltd., Seoul (KR)

( * ) Notice: Subject to any disclaimer, the term of this patent is extended or adjusted under 35 U.S.C. 154(b) by 350 days.

(21) Appl. No.: 17/994,100

(22) Filed: Nov. 25, 2022

(65) Prior Publication Data

US 2024/0178501 A1　　May 30, 2024

(51) Int. Cl.
　　*H01M 10/04*　　　(2006.01)
　　*H01M 50/204*　　(2021.01)
　　*H01M 50/233*　　(2021.01)
　　*H01M 50/256*　　(2021.01)
　　*H01M 50/296*　　(2021.01)

(52) U.S. Cl.
　　CPC ..... *H01M 10/0404* (2013.01); *H01M 50/204* (2021.01); *H01M 50/233* (2021.01); *H01M 50/256* (2021.01); *H01M 50/296* (2021.01)

(58) Field of Classification Search
None
See application file for complete search history.

(56) References Cited

U.S. PATENT DOCUMENTS

| | | | |
|---|---|---|---|
| 2017/0133641 A1 * | 5/2017 | Lee | .................... H01M 50/291 |
| 2018/0074130 A1 | 3/2018 | Jeung et al. | |
| 2020/0141065 A1 | 5/2020 | Coots | |
| 2022/0294063 A1 | 9/2022 | Lee et al. | |

FOREIGN PATENT DOCUMENTS

| | | |
|---|---|---|
| CN | 109175679 A | 1/2019 |
| CN | 213504086 U | 6/2021 |
| EP | 2894026 B1 | 7/2015 |
| EP | 4016661 A1 | 6/2022 |
| JP | H05112388 A | 5/1993 |
| JP | H0649429 U | 7/1994 |
| JP | H0739847 U | 7/1995 |
| JP | H07179219 A | 7/1995 |

(Continued)

OTHER PUBLICATIONS

Abstract of JP-2020119822-A (Year: 2020).*

*Primary Examiner* — Gregg Cantelmo

(74) *Attorney, Agent, or Firm* — Bookoff McAndrews, PLLC

(57) ABSTRACT

A battery cell transport system for a battery cell having a first electrode and a second electrode is provided. The system includes a basket having first, second, third, and fourth side walls coupled to a bottom wall, and an extension member. The extension member is coupled to the first side wall. The basket holds the battery cell such that the first and second electrodes point toward the first and second side walls, respectively. The system includes a transport device that holds the basket thereon. The system includes first and second vertical members disposed proximate to first and second sides, respectively, of the transport device. The extension member contacts the second vertical member when the basket is in an undesired position on the transport device such that the basket is prevented from moving past the first and second vertical members.

10 Claims, 7 Drawing Sheets

(56)          References Cited

FOREIGN PATENT DOCUMENTS

| JP | H0812049 | A | | 1/1996 |
|----|----------|---|---|--------|
| JP | H10139045 | A | | 5/1998 |
| JP | 3576213 | B2 | | 10/2004 |
| JP | 2020119822 | A | * | 8/2020 |
| KR | 20160143068 | A | | 12/2016 |
| KR | 101973741 | B1 | | 4/2019 |
| KR | 20200141249 | A | | 12/2020 |
| KR | 20220039227 | A | | 3/2022 |

* cited by examiner

121

142    140

141

121

140

161    151

160    150

142    141

500

User provides a battery cell having a battery housing, a first electrode, and a second electrode; the first and second electrodes being disposed on first and second ends, respectively of the battery housing

502

User provides a basket having first, second, third, and fourth side walls coupled to a bottom wall, and an extension member; the first and second side walls being coupled to and between the third and fourth side walls and extending parallel to one another; the extension member being coupled to and extending outwardly from the first side wall

504

User provides a transport device

506

User provides first and second vertical members disposed proximate to first and second sides, respectively, of the transport device

508

User disposes the battery cell in the basket such that the first electrode is pointing toward the first side wall, and the second electrode is pointing toward the second side wall

510

User disposes the basket on the transport device in an undesired position such that the transport device holds the basket thereon and moves the basket in a first direction, the first direction being parallel to the first and second side walls; the basket being in the undesired position when the first side wall and the extension member of the basket are proximate to the second side of the transport device

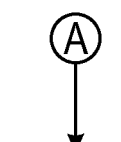

512
| Transport device moves the basket in the first direction such that the extension member on the basket contacts the second vertical member when the basket is in the undesired position on the transport device and the basket is prevented from moving past the first and second vertical members |

514
| User disposes the basket on the transport device in a desired position such that the transport device holds the basket thereon and moves the basket in the first direction, the basket being in the desired position when the first side wall and the extension member of the basket are disposed proximate to the first side of the transport device |

516
| Transport device moves the basket in the first direction such that the extension member on the basket moves through a slot in the first vertical member and the basket is allowed to move past the first and second vertical members when the basket is in the desired position on the transport device |

FIG. 12

BATTERY CELL TRANSPORT SYSTEM FOR A BATTERY CELL

BACKGROUND

During a battery pack manufacturing process, the inventors herein have recognized that an operational position of a basket holding battery cells needs to be validated during movement of the basket to ensure the proper position/orientation of the basket on a transport device.

In particular, the inventors herein have recognized a need for a battery cell transport system that prevents baskets from advancing past a particular position when the baskets have an undesired position/orientation on a transport device.

SUMMARY

A battery cell transport system for a battery cell in accordance with an exemplary embodiment is provided. The battery cell has a battery housing, a first electrode, and a second electrode. The first and second electrodes are disposed on first and second ends, respectively of the battery housing. The battery cell transport system includes a basket having first, second, third, and fourth side walls coupled to a bottom wall, and an extension member. The first and second side walls are coupled to and between the third and fourth side walls and extend parallel to one another. The extension member is coupled to and extends outwardly from the first side wall. The basket holds the battery cell therein such that the first electrode is pointing toward the first side wall, and the second electrode is pointing toward the second side wall. The battery cell transport system further includes a transport device that holds the basket thereon and moves the basket in a first direction. The first direction is parallel to the first and second side walls. The battery cell transport system further includes first and second vertical members disposed proximate to first and second sides, respectively, of the transport device. The extension member on the basket contacts the second vertical member when the basket is in an undesired position on the transport device such that the basket is prevented from moving past the first and second vertical members.

A method for transporting a battery cell in accordance with another exemplary embodiment is provided. The battery cell has a battery housing, a first electrode, and a second electrode. The first and second electrodes are disposed on first and second ends, respectively of the battery housing. The method includes providing a basket having first, second, third, and fourth side walls coupled to a bottom wall, and an extension member. The first and second side walls are coupled to and between the third and fourth side walls and extend parallel to one another. The extension member is coupled to and extend outwardly from the first side wall. The method further includes providing a transport device for moving the basket. The method further includes providing first and second vertical members disposed proximate to first and second sides, respectively, of the transport device. The method further includes disposing the battery cell in the basket such that the first electrode is pointing toward the first side wall, and the second electrode is pointing toward the second side wall. The method further includes disposing the basket on the transport device in an undesired position. The method further includes moving the basket in a first direction utilizing the transport device such that the extension member on the basket contacts the second vertical member when the basket is in the undesired position on the transport device and the basket is prevented from moving past the first and second vertical members. The first direction is parallel to the first and second side walls.

DESCRIPTION OF THE DRAWINGS

FIGS. 11 and 12 are flowcharts of a method for transporting a battery cell in accordance with another exemplary embodiment.

DETAILED DESCRIPTION

Referring to FIGS. 1-10, a battery cell transport system 20 for transporting battery cells 30, 32 in accordance with an exemplary embodiment is illustrated.

Figures 3, 4:
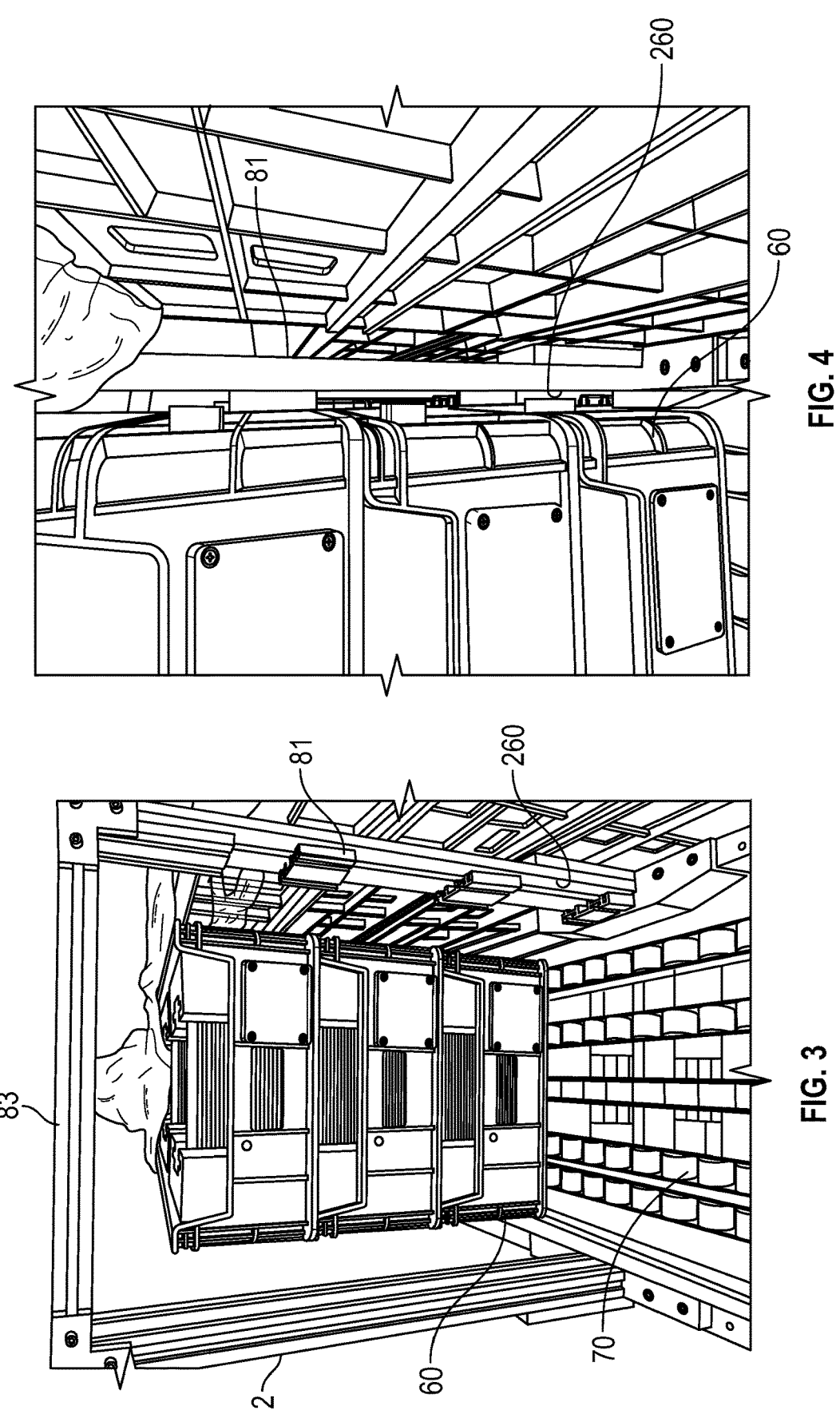
FIG. 3 is a schematic illustrating first and second vertical members, a horizontal top member, a transport device, at least one basket utilized in the battery cell transport system of FIG. 1.
FIG. 4 is an enlarged view of a portion of the first vertical member having a slot therein, and at least one basket of FIG. 3.
Figures 5, 6:
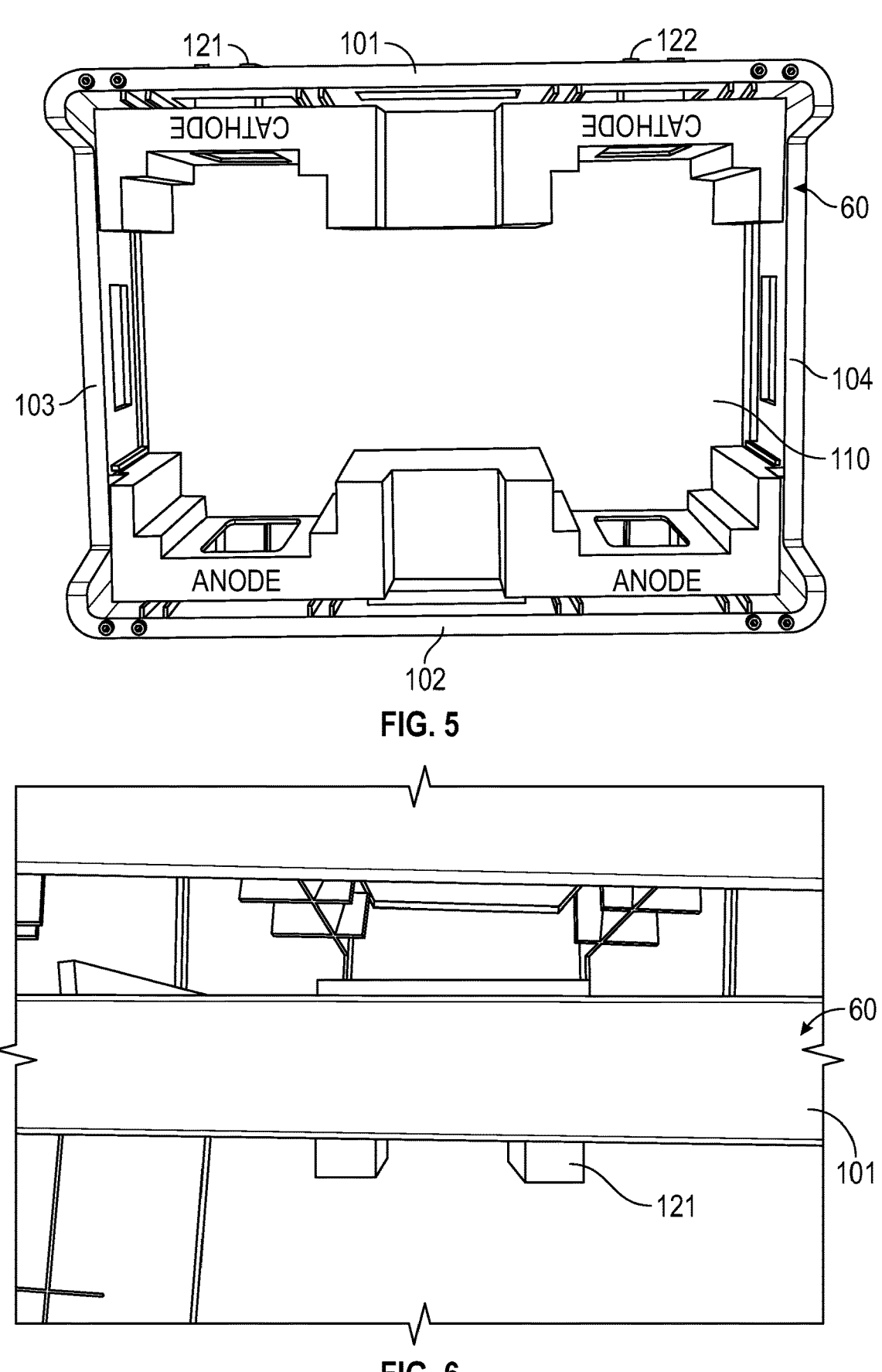
FIG. 5 is a top view of a basket utilized in the battery cell transport system of FIG. 1.
FIG. 6 is a top view of a portion of a first side wall of the basket of FIG. 5.

The battery cell transport system 20 includes a basket 60, a transport device 70, a first vertical member 81, a second vertical member 82, and a horizontal top member 83 (shown in FIG. 3). An advantage of the system 20 is that the system 20 prevents the basket 60 from moving past the first and second vertical members 81, 82 when the basket 60 is placed in an undesired position (shown in FIG. 1) on the transport device 70 (and as a result the battery cells 30, 32 which are in an improper position relative to the transport device 70 do not advance to a subsequent welding process).

The term "proximate" used herein means within 0-1 foot in distance.

Referring to FIGS. 1 and 5-8, the basket 60 is provided to hold the battery cells 30, 32 therein. The basket 60 has first, second, third, and fourth side walls 101, 102, 103, 104 coupled to a bottom wall 110, and extension members 121, 122. The first and second side walls 101, 102 are coupled to and between the third and fourth side walls 103, 104 and extend parallel to one another. The first side wall 101 includes first and second apertures 131, 132 (shown in FIG. 7) extending therethrough. The basket 60 holds the battery cell 30 therein such that a first electrode 121 thereof points toward the first side wall 101, and a second electrode 322 thereof points toward the second side wall 102. Further, the basket 60 holds the battery cell 32 therein such that a first electrode 421 thereof points toward the first side wall 101, and a second electrode 422 thereof points toward the second side wall 102. In an exemplary embodiment, the first, second, third, and fourth side walls 101, 102, 103, 104, and the bottom wall 110 are constructed of plastic.

Referring to FIGS. 5-8, the extension members 121, 122 are coupled to and extend outwardly from the first side wall 101. The structure of the extension members 121, 122 are identical so that only the structure of extension member 121 will be discussed in greater detail herein. Also, the attachment of the extension members 121, 122 to the basket 60 are performed in a similar manner so only the attachment of the extension member 121 will be discussed herein.

Figure 7:
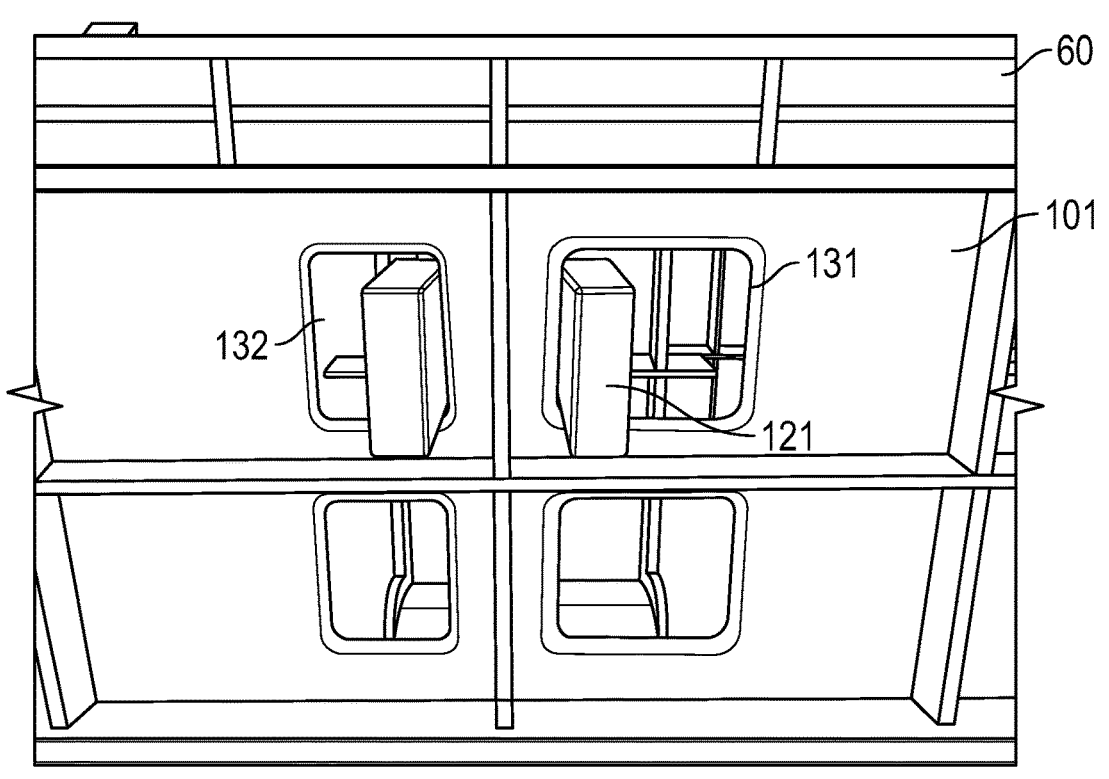
FIG. 7 is a side view of a portion of the first side wall of the basket of FIG. 5.
Figure 8:
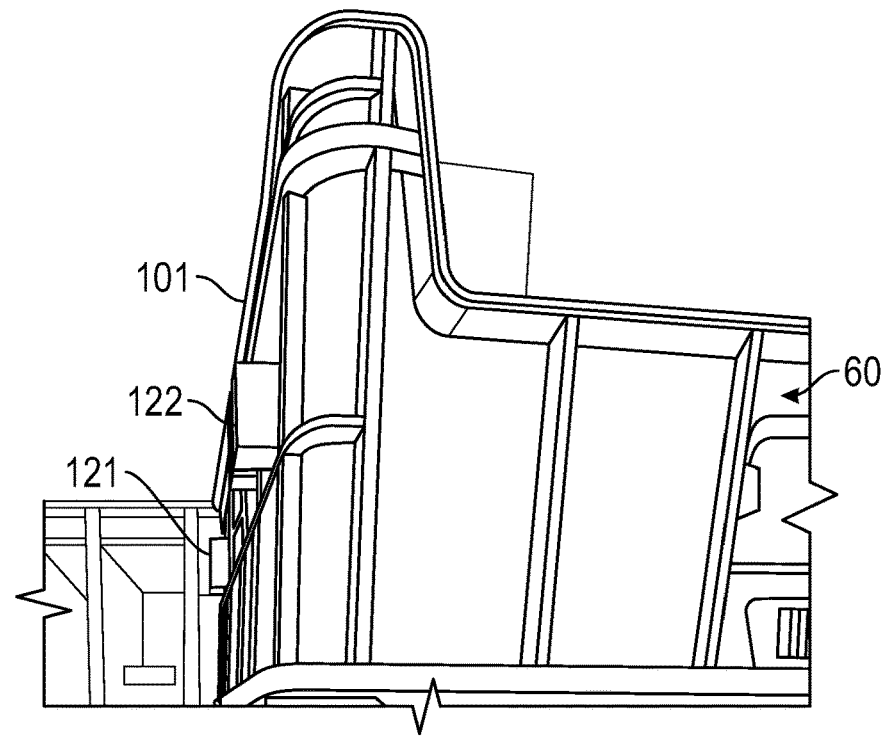
FIG. 8 is a perspective view of a portion of the first side wall of the basket of FIG. 6.
Figures 9, 10:
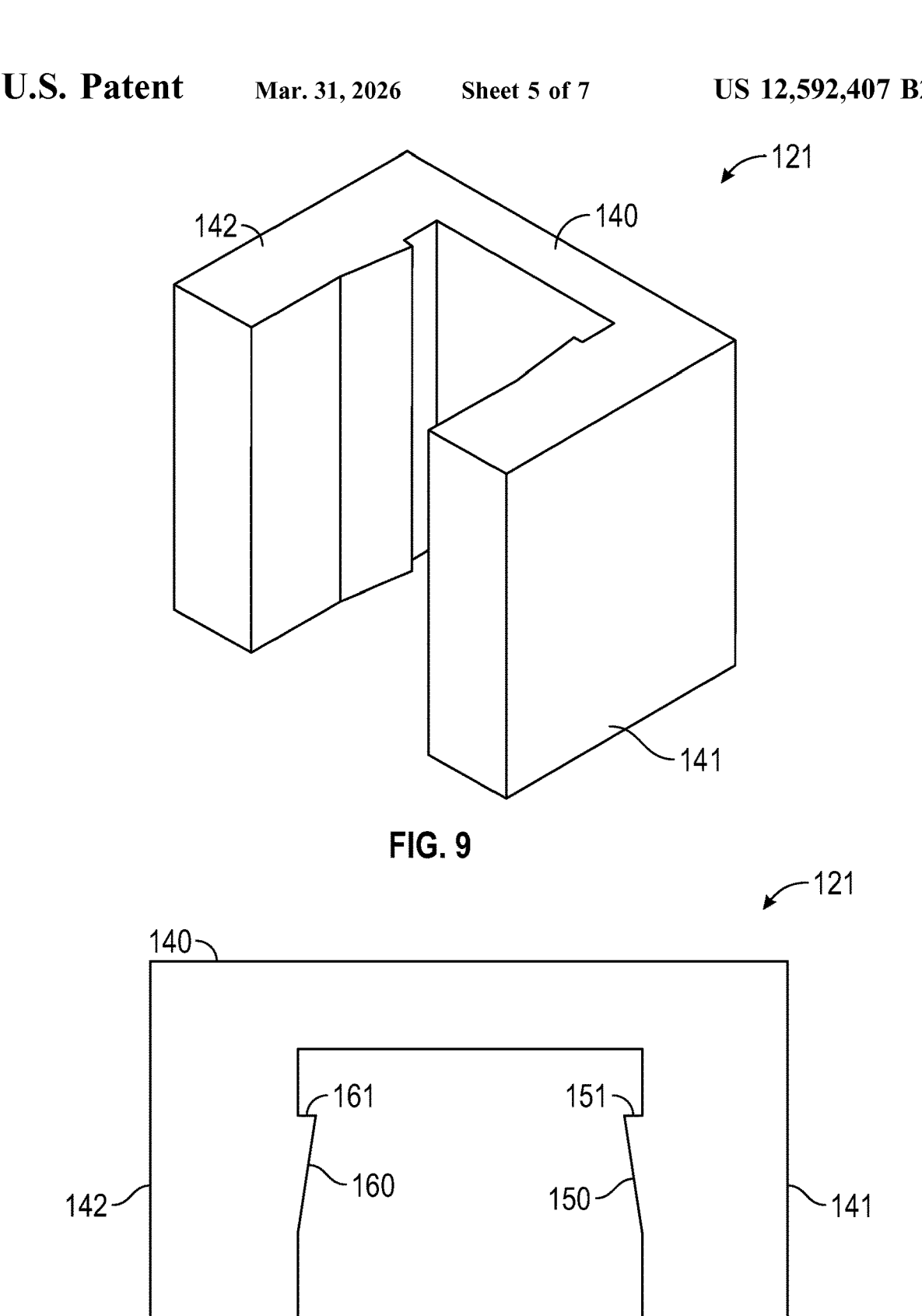
FIG. 9 is an isometric view of an extension portion of the basket of FIG. 5.
FIG. 10 is a top view of the extension portion of FIG. 9.

Referring to FIGS. 7, 9 and 10, the extension member 121 includes a coupling wall 140 and first and second leg members 141, 142 coupled to and extending from the coupling wall 140 in a first direction. The first leg member 141 has an inner surface 150 defining a ledge 151 that is parallel to the coupling wall 140 and spaced apart from the coupling wall 140. Also, the second leg member 142 has an inner surface 160 defining a ledge 161 that is parallel to the coupling wall 140 and spaced apart from the coupling wall 140. In an exemplary embodiment, the extension member 121 is constructed of plastic. Referring to FIGS. 7 and 10, the coupling wall 140 is disposed against an inner surface of the first side wall 101 of the basket 60 such that the first and second leg members 141, 142 extend through the first and second apertures 131, 132, respectively, of the first side wall 101, and the ledges 151, 161 are disposed against an outer surface of the first side wall 101.

Referring to FIGS. 1-4, the transport device 70 is provided to hold the basket 60 thereon and to move the basket 60 in a first direction toward the first and second vertical members 81, 82. The transport device 70 has a first side 241 and a second side 242. The first direction is parallel to the first and second side walls 101, 102 of the basket 60 and parallel to the first and second sides 241, 242. In an exemplary embodiment, the transport device 70 is a conveyor system.

Figures 1, 2:
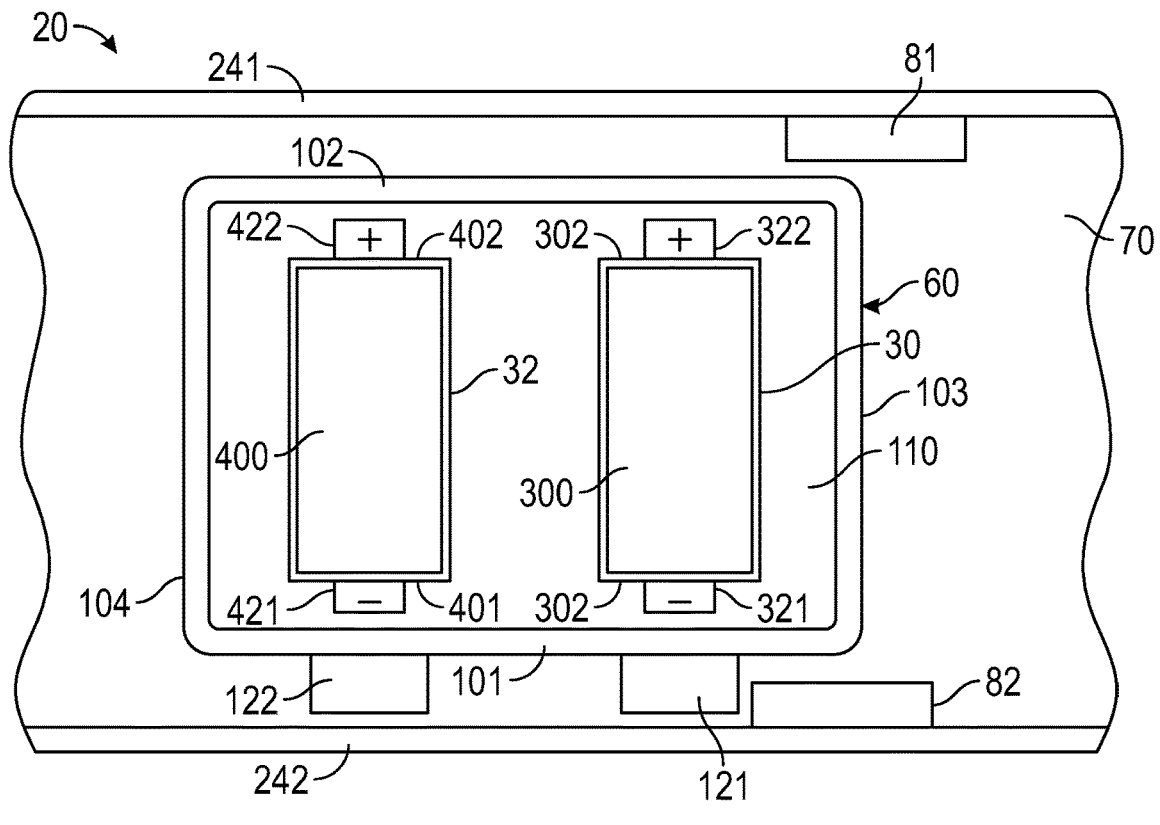
FIG. 1 is a simplified schematic of a battery cell transport system for transporting battery cells in accordance with an exemplary embodiment wherein a basket holding the battery cells has an undesired position on a transport device.
FIG. 2 is another simplified schematic of the battery cell transport system of FIG. 1 wherein the basket holding battery cells has a desired position on a transport device.

Referring to FIGS. 1, 3 and 4, the first and second vertical members 81, 82 are disposed proximate to the first and second sides 241, 242, respectively, of the transport device 70. A horizontal top member 83 is coupled to and between a top end of the first vertical member 81 and a top end of the second vertical member 82. The first vertical member 81 has a slot 260 extending therein.

When the basket 60 has a desired position/placement (shown in FIG. 2) on the transport device 70, the transport device 70 moves the basket 60 such that the first and second extension members 121, 122 move through the slot 260 in the first vertical member 81 and the basket 60 moves past the first and second vertical members 81, 82. The basket 60 has the desired position (shown in FIG. 2) on the transport device 70 when the first side wall 101 and the extension members 121, 122 of the basket 60 are proximate to the first side 241 of the transport device 70.

Alternately, when the basket is in an undesired position/placement (shown in FIG. 1) on the transport device 70, the extension members 121, 122 on the basket 60 contact the second vertical member 82 such that the basket 60 is prevented from moving past the first and second vertical members 81, 82. The basket 60 is in the undesired position (shown in FIG. 1) on the transport device 70 when the first side wall 101 and the extension members 121, 122 of the basket 60 are disposed proximate to the second side 242 of the transport device 70.

Referring to FIG. 1, the battery cell 30 includes a battery housing 300, a first electrode 321, and a second electrode 322. The first and second electrodes 321, 322 are disposed on first and second ends 301, 302, respectively of the battery housing 300. Further, the battery cell 32 includes a battery housing 400, a first electrode 421, and a second electrode 422. The first and second electrodes 421, 422 are disposed on first and second ends 401, 402, respectively of the battery housing 400.

Referring to FIGS. 1, 2, 11 and 12, a flowchart of a method for transporting the battery cell 30 will be explained in accordance with another exemplary embodiment. For purposes of simplicity, the battery cell 30 and the extension member 121 will be described in the following method.

At step 500, a user provides a battery cell 30 having a battery housing 300, a first electrode 321, and a second electrode 322. The first and second electrodes 321, 322 are disposed on first and second ends 301, 302, respectively of the battery housing 300.

At step 502, the user provides a basket 60 having first, second, third, and fourth side walls 101, 102, 103, 104 coupled to a bottom wall 110, and an extension member 121. The first and second side walls 101, 102 are coupled to and between the third and fourth side walls 103, 104 and extend parallel to one another. The extension member 121 is coupled to and extends outwardly from the first side wall 101.

At step 504, the user provides a transport device 70

At step 506, the user provides first and second vertical members 81, 82 disposed proximate to first and second sides 241, 242, respectively, of the transport device 70.

At step 508, the user disposes the battery cell 30 in the basket 60 such that the first electrode 321 is pointing toward the first side wall 101, and the second electrode 322 is pointing toward the second side wall 102.

At step 510, the user disposes the basket 60 on the transport device 70 in an undesired position (shown in FIG. 1) such that the transport device 70 holds the basket 60 thereon and moves the basket 60 in a first direction. The first direction is parallel to the first and second side walls 101, 102. The basket 60 is in the undesired position (shown in FIG. 1) when the first side wall 101 and the extension member 121 of the basket 60 are proximate to the second side 242 of the transport device 70.

At step 512, the transport device 70 moves the basket 60 in the first direction such that the extension member 121 on the basket 60 contacts the second vertical member 82 when the basket 60 is in the undesired position on the transport device 70 and the basket 60 is prevented from moving past the first and second vertical members 81, 82.

At step 514, the user disposes the basket 60 on the transport device 70 in a desired position (shown in FIG. 2) such that the transport device 70 holds the basket 60 thereon and moves the basket 60 in the first direction. The basket 60 is in the desired position (shown in FIG. 2) when the first side wall 101 and the extension member 121 of the basket 60 are disposed proximate to the first side of the transport device 70.

At step 516, the transport device 70 moves the basket 60 in the first direction such that the extension member 121 on the basket 60 moves through a slot 260 in the first vertical member 81 and the basket 60 is allowed to move past the first and second vertical members 81, 82 when the basket 60 is in the desired position on the transport device 70.

The battery cell transport system 20 and associated method provide a substantial advantage over other systems and methods. In particular, the system 20 prevents the basket 60 from moving past the first and second vertical members 81, 82 when the basket 60 is placed in an undesired position on the transport device 70 (and as a result the battery cells 30, 32 which are in an improper position relative to the transport device 70 do not advance to a subsequent welding process).

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A battery cell transport system for a battery cell, the battery cell having a battery housing, a first electrode, and a second electrode; the first and second electrodes being disposed on first and second ends, respectively of the battery housing, comprising:
   a basket having first, second, third, and fourth side walls coupled to a bottom wall, and an extension member; the first and second side walls being coupled to and between the third and fourth side walls and extending parallel to one another; the extension member being coupled to and extending outwardly from the first side wall; the basket holding the battery cell therein such that the first electrode is pointing toward the first side wall, and the second electrode is pointing toward the second side wall;
   a transport device that holds the basket thereon and moves the basket in a first direction, the first direction being parallel to the first and second side walls;
   first and second vertical members disposed proximate to first and second sides, respectively, of the transport device, the extension member on the basket contacting the second vertical member when the basket is in an undesired position on the transport device such that the basket is prevented from moving past the first and second vertical members.

2. The battery cell transport system of claim 1, wherein:
   the extension member on the basket moves through a slot in the first vertical member when the basket is in a desired position on the transport device such that the basket is allowed to move past the first and second vertical members.

3. The battery cell transport system of claim 2, wherein:
   the basket is in the desired position on the transport device when the first side wall and the extension member of the basket are proximate to the first side of the transport device.

4. The battery cell transport system of claim 1, wherein:
   the basket is in the undesired position on the transport device when the first side wall and the extension member of the basket are disposed proximate to the second side of the transport device.

5. The battery cell transport system of claim 1, further comprising:

a horizontal top member coupled to and between a top end of the first vertical member and a top end of the second vertical member.

6. The battery cell transport system of claim 1, wherein the first side wall of the basket has first and second apertures disposed therethrough.

7. The battery cell transport system of claim 1, wherein:
   the extension member having a coupling wall and first and second leg members coupled to and extending from the coupling wall in a first direction;
   the first leg member having a first inner surface defining a first ledge; and
   the second leg member having a second inner surface defining a second ledge.

8. The battery cell transport system of claim 7, wherein:
   the coupling wall is disposed against an inner surface of the first side wall of the basket such that the first and second leg members extend through the first and second apertures, respectively, of the first side wall, and the first and second ledges are disposed against an outer surface of the first side wall.

9. A method for transporting a battery cell, the battery cell having a battery housing, a first electrode, and a second electrode; the first and second electrodes being disposed on first and second ends, respectively of the battery housing, the method comprising:
   providing a basket having first, second, third, and fourth side walls coupled to a bottom wall, and an extension member; the first and second side walls being coupled to and between the third and fourth side walls and extending parallel to one another; the extension member being coupled to and extending outwardly from the first side wall;
   providing a transport device for moving the basket;
   providing first and second vertical members disposed proximate to first and second sides, respectively, of the transport device;
   disposing the battery cell in the basket such that the first electrode is pointing toward the first side wall, and the second electrode is pointing toward the second side wall;
   disposing the basket on the transport device in an undesired position; and
   moving the basket in a first direction utilizing the transport device such that the extension member on the basket contacts the second vertical member when the basket is in the undesired position on the transport device and the basket is prevented from moving past the first and second vertical members, the first direction being parallel to the first and second side walls.

10. The method of claim 9, further comprising:
   disposing the basket on the transport device in a desired position; and
   moving the basket in the first direction utilizing the transport device such that the extension member on the basket moves through a slot in the first vertical member and the basket moves past the first and second vertical members when the basket is in the desired position on the transport device.

* * * * *